(12) United States Patent
Kalinin et al.

(10) Patent No.: US 7,151,337 B2
(45) Date of Patent: *Dec. 19, 2006

(54) PRESSURE MONITOR INCORPORATING SAW DEVICE

(75) Inventors: Victor Alexandrovich Kalinin, Oxford (GB); Mark Lee, Totton (GB); Raymond David Lohr, Long Crendon (GB); Arthur John Leigh, Banbury (GB)

(73) Assignee: Transense Technologies PLC (GB)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 10/508,468
(22) PCT Filed: Mar. 17, 2003
(86) PCT No.: PCT/GB03/01181

§ 371 (c)(1),
(2), (4) Date: Apr. 25, 2005

(87) PCT Pub. No.: WO03/081195

PCT Pub. Date: Oct. 2, 2003

(65) Prior Publication Data

US 2005/0225214 A1    Oct. 13, 2005

(30) Foreign Application Priority Data

Mar. 21, 2002  (GB) .................. 0206705.6
Jan. 31, 2003  (GB) .................. 0302311.6
Mar. 10, 2003  (GB) .................. 0305461.6

(51) Int. Cl.
*H03H 9/00*    (2006.01)

(52) U.S. Cl. .............. 310/313 R; 310/313 B; 310/348

(58) Field of Classification Search ......... 310/313, 310/340, 342, 344, 347–348
See application file for complete search history.

(56) References Cited

U.S. PATENT DOCUMENTS 3,878,477 A    4/1975    Dias et al.

(Continued)

FOREIGN PATENT DOCUMENTS

FR    2561383    9/1985

(Continued)

OTHER PUBLICATIONS

W. Buff et al., "Universal Pressure and Temperature Saw Sensor For Wireless Applications," Tech. Univ. of Ilmenau, Inst. of Solid State Elec., Ilmenau, Germany; 1997 IEEE Ultrasonics Symposium; pp. 359-362.

(Continued)

*Primary Examiner*—Darren Schuberg
*Assistant Examiner*—J. Aguirrechea
(74) *Attorney, Agent, or Firm*—Keusey, Tutunjian & Bitetto, P.C.

(57) ABSTRACT

A pressure monitor has a base and a lid secured to the base to define a substantially fluid tight chamber. At least part of the lid is flexible and forms a diaphragm which deflects responsive to changes in fluid pressure surrounding the monitor. A projection provided on the diaphragm transmits movement thereof to a distortable substrate located within the chamber. A first SAW device is mounted on the distortable substrate, and at least a second and third SAW device are mounted within the chamber. The second SAW device carried on a reference substrate section has its direction of propagation inclined at an angle to the direction of propagation of at least one of the first and third SAW devices. This way movement of the diaphragm induced by a change in pressure in the zone surrounding the monitor results in distortion of the distortable substrate, which is measurable by the SAW device mounted thereon, without distorting said reference substrate section.

10 Claims, 3 Drawing Sheets

U.S. PATENT DOCUMENTS

| | | | |
|---|---|---|---|
| 4,813,271 A | 3/1989 | Greenwood | |
| 6,060,812 A * | 5/2000 | Toda | 310/313 R |
| 6,865,950 B1 * | 3/2005 | Freakes et al. | 73/702 |
| 6,907,787 B1 * | 6/2005 | Cook et al. | 73/700 |
| 2002/0078757 A1 | 6/2002 | Hines et al. | |
| 2002/0084858 A1 * | 7/2002 | Luff | 331/68 |
| 2005/0109095 A1 * | 5/2005 | Sinnett | 73/146.5 |
| 2005/0225214 A1 * | 10/2005 | Kalinin et al. | 310/348 |

FOREIGN PATENT DOCUMENTS

| | | |
|---|---|---|
| GB | 2235533 | 3/1991 |
| GB | 2352814 | 2/2001 |
| GB | 2361318 | 10/2001 |
| GB | 2372328 | 8/2002 |
| JP | 61080024 | 4/1986 |

OTHER PUBLICATIONS

Y. Vlassov et al., "Precision Saw Pressure Sensors", Inst. of Semiconductor Physics, Siberian Branch of the Russian Academy of Science; Novosibisk, Russia; 1993; pp. 665-669.

* cited by examiner

PRESSURE MONITOR INCORPORATING SAW DEVICE

FIELD OF INVENTION

This invention relates to a pressure monitor incorporating a SAW device.

DESCRIPTION OF THE RELATED ART

Pressure monitors incorporating SAW devices have been proposed, for example in our United Kingdom patent application GB-A-2352814. The SAW devices are used to produce an electrical signal indicative of the position of a pressure sensitive member, for example a diaphragm, which is used to divide a chamber containing a reference pressure from a chamber which is subject to a variable pressure. The present invention relates to an improved pressure monitor of this type. GB 2235533 discloses a piezoelectric sensor device in which a surface acoustic wave device is mounted on a flexible diaphragm which is supported around its periphery by an integral rigid assembly. Displacement of the diaphragm, for example in response to an applied pressure, induces a strain in the piezoelectric material thus causing a corresponding change in the characteristic frequency of the SAW device. These changes in the characteristic frequency of the SAW device are, then, used as a measure of the deflection of the diaphragm and hence of the pressure applied thereto. This device has the advantage that, by mounting the SAW device on the diaphragm, the device is very sensitive. However, mechanical edge effects associated with clamping the edge of the diaphragm considerably complicate interpreting the signal receiver from the SAW device. Furthermore, variations in temperature will cause variations in the characteristic frequency of the SAW device which will effect the accuracy of the device.

SUMMARY

In accordance with the first aspect of the present invention there is provided a pressure monitor comprising a base having a rigid frame; a lid secured to the base to define with the base a substantially fluid tight chamber, at least part of the lid being flexible and forming a diaphragm which will deflect in response to changes in the fluid pressure surrounding the monitor; means remote from the edge of the frame for transmitting movement of the diaphragm to a distortable substrate located within the chamber, the distortable substrate having a first SAW device mounted thereon, and at least a second and a third SAW device mounted within the chamber, said second SAW device being carried on a reference substrate section and having its direction of propagation inclined at an angle to the direction of propagation of at least one of said first and third SAW devices, wherein movement of the diaphragm induced by a change in pressure in the zone surrounding the monitor results in distortion of the distortable substrate, which is measurable by the SAW device mounted thereon, without distorting said reference substrate section.

The SAW devices may be of the resonator type in which case the distortion of the SAW device may be measured by measuring the change in resonant frequency produced by the distortion, or may be of the delay line type in which case the distortion of the SAW device may be measured by measuring the change in delay characteristics produced by the distortion. Accordingly, changes in the pressure to which the monitor is subjected may be determined by observing the changes in the characteristics of the SAW device.

In a particularly preferred embodiment of the invention, the SAW device is supported by the frame and extends along the length of the chamber enclosed by the rigid frame and the lid. Accordingly, deflection of the lid acting as a diaphragm will cause bending of the SAW device with a resulting change in output of the SAW device.

By providing three SAW resonator devices having different resonance frequencies, by analysis of the frequency shifts produced by distortion of one of the SAW devices a temperature compensated indication of the distortion of the SAW device and accordingly the displacement of the diaphragm may be obtained, together with an indication of temperature of the SAW device. The three SAW devices may be located on the same side of a common substrate or two may be located on one side of a common substrate and the other located on the opposite side of the common substrate. Alternatively, two individual substrates, one carrying two SAW devices (on the same or respective opposite sides thereof) and one carrying one SAW device may be provided. If more than one substrate is provided the arrangement should be such that one SAW device is subjected to strain from the deflection of the lid and the other two SAW devices are unstrained providing references for pressure and temperature measurement. The orientation of one of the unstrained SAW devices is at a non-zero angle to the propagation direction of the other unstrained SAW device to provide unambiguous temperature information.

In a preferred embodiment of the invention, the means remote from the edge of the frame for transmitting movement of the diaphragm to the SAW device comprises one or more bumps provided on the lid which can press on the substrate of a SAW device but which cannot exert a pulling force on the SAW device. The or each bump may be provided by a depression formed in the material of the lid or by means of a suitable member secured to the lid.

In one embodiment, the chamber is hermetically sealed with a reference pressure. The reference pressure is selected so that when the device is located within the zone in which it is to operate, the pressure surrounding the device is higher than the reference pressure with a result that the diaphragm will deflect inwardly of the base and exert a force on one of the SAW devices.

Preferably, the base is a ceramic or metal base to which the lid is secured.

In one embodiment of the invention, a single sided SAW device is mounted face down supported by the base with the diaphragm bump pressing from the back and a second substrate is mounted in an unstrained area and carries the two reference SAW devices (one for pressure and one for temperature). According to a further embodiment of the invention, a double sided SAW device is used to detect pressure transmitted by two bumps and the reference SAW devices are mounted in an unstrained location in the chamber for temperature and pressure reference information.

At least three SAW devices, one inclined with respect to at least one of the others, are required so that both temperature and pressure measurements can be attained. Two of the SAW devices may be respectively mounted on one side of two substrates, or two of them may be mounted on the opposite sides of one substrate. If two substrates are provided, the lid preferably includes three indentations whereby the two substrates may each be supported along one edge by a common ridge and along an opposite edge by a respective ridge. Preferably, the substrates extend side by side along the lid.

The devices may be arranged so that two are strained and one is unstrained. Two strained SAW devices are then arranged so that one is deformed in compression and one being deformed in tension by movement of the lid. The SAW devices may be laid down on the opposite sides of a common substrate or on separate substrates. If separate substrates are used they should be arranged so that simultaneously one SAW device is deformed in compression and one SAW device is deformed in tension.

Preferably, the lid acting as a diaphragm includes a metal alloy, for example an iron, cobalt, or nickel alloy. For example, the lid may be of KOVAR™. The base is preferably of a metal alloy (for example KOVAR™.) but may be of any suitable material, for example a ceramic material.

The ultimate tensile bending strength of a brittle material depends not only on its size and stiffness but also on the presence of pre-existing defects. When the SAW devices in the system of the invention are bent during operation the surface on the outside of the bend is placed in tension whilst the surface on the inside of the bend is placed in compression. Any pre-existing defect which exists in the surface under tension will, then, be an area of weakness and hence likely to be the initial source of any failure of the component under bending. The failure strength under bending will, therefore, be limited by the size of the largest pre-existing defect in the component.

Conventionally, quartz planar components are produced by grinding and lapping operations, which results in a large number of small defects on the surfaces thereof whose size is characteristic of the grinding and lapping processes. The compressed surface of the component is then finished by polishing so as to facilitate deposition of metal thereto to form the various components of the SAW device. Traditionally, however, the tensioned surface has not been so finished for two reasons: firstly, because the extra cost involved in polishing both surfaces of the component was deemed unnecessary, and secondly, because the unpolished surface was found to suppress reflection of the bulk wave during operation of the SAW device, thereby reducing parasitic losses which result from those reflections.

It has, therefore, been found that the bending strength of the SAW devices can be significantly improved if opposing surfaces of the component are polished so as to reduce both the number and of size of the defects in the surface, that is both the surface upon which metal is deposited to form components of the SAW device and which, upon bending of the device during use, will be under compression, and the opposite surface thereof which, upon bending of the device in use, will be tensioned, both said first and second surfaces being polished.

Further improvements may advantageously be achieved by also polishing the edges of the SAW device in order to eliminate any stress raisers resulting from the cutting of the device from the wafer.

The SAW devices in the invention may be glued in place by using conventional adhesives, but the mechanical properties of the pulling bond have been found to reduce the responsiveness and sensitivity of SAW devices. Instead, therefore, it has been found to be advantageous to fasten the SAW devices by soldering, which may be achieved by providing a metallization layer on the bonding surface of the substrate of the device. Soldering has the advantage of greatly improving the transfer of strain and thermal properties of the transducer, and hence improves the accuracy and sensitivity of a SAW.

It has been found to be particularly advantageous to provide a metallization layer which is formed of a multi-metallic coating having an outer layer formed of gold, and to then solder the SAW in place using AuSn eutectic composition solder.

This has the advantage of bonding well to the metalized layer, particular if a multi-metallic coating is applied to the bonding surface of the SAW with the outer coating thereof being gold, and couples the SAW particularly effectively to the stress field of the structural component which it is intended to measure due to the high stiffness (68 GPa) and strength (275 MPa tensile) of AuSn enabling it to act as a good strain transfer medium.

Unlike a conventional polymeric backed foil strain gauge, single crystal quartz is a stiff material (80 GPa), and the stress levels required successfully to transmit strain from a structural member formed of, for example, steel, in a quartz SAW device are necessarily high. As a result, creep will manifest itself at much lower temperatures if a conventional strain gauge adhesive, such as M BOND 610™, is used. The use of AuSn, in contrast, results in much lower levels of creep and hysteresis at the high temperatures, which can be up to 125 degrees centigrade, typically encountered in automotive applications.

BRIEF DESCRIPTION OF THE DRAWINGS

The invention will be better understood from the following description of preferred embodiments thereof, given by way of example only, reference being had to the accompanying drawings wherein.

DETAILED DESCRIPTION OF PREFERRED EMBODIMENTS

Figure 1A:
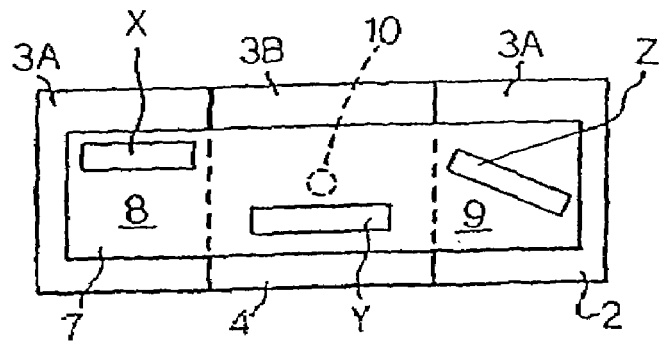
FIG. 1A is a schematic view of a first embodiment of the invention before application of the lid.
Figure 1B:
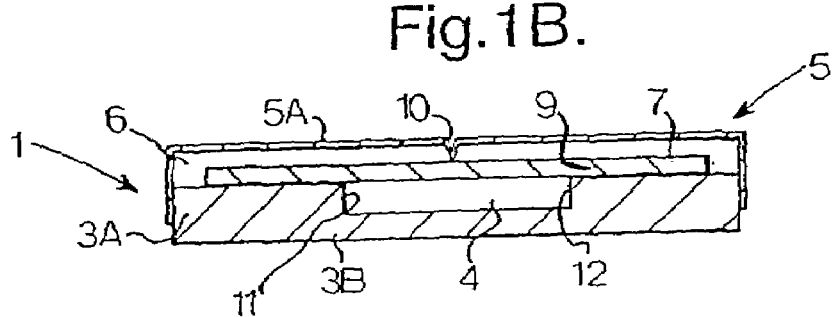
FIG. 1B is a schematic cross sectional view of the first embodiment of the invention along the line 1B—1B of FIG. 1A, with the lid in place.

Referring firstly to FIGS. 1A and 1B, there is shown schematically a pressure monitor 1 comprising a base 2 having rigid frame 3A and a rigid base 3B which together define a shallow rectangular container 4. The container 4 may be formed of any suitable material, and in the preferred embodiment of the invention is formed of a metal material, for example KOVAR™. The container 4 has secured to the open end thereof a lid 5 having a major surface 5A acting as a diaphragm. The lid may be of any suitable material, for example KOVAR™. Both the material from which the base is made and the material from which the lid acting as a diaphragm is made are preferably impermeable to gas and the seal between the lid and the base is also preferably impermeable to gas. The seal between the lid in the base may be formed by any convenient means. If both the lid and the base are of suitable metal alloys, the seal therebetween may be formed by a soldering process. When the lid 5 acting as a diaphragm is secured to the base 4, a sealed chamber 6 is defined by the lid and the base. The absolute pressure contained within the chamber 6 is determined at the time of manufacture in light of the pressure conditions to which the device is to be sensitive. If, for example, the device is intended to monitor the pressure within a vehicle tire, it will typically operate within a zone having pressure of two to ten bar and under these circumstances the pressure sealed within the chamber 6 may, for example be one bar at a temperature of 20° C. Alternatively, a vacuum may be sealed in the chamber 6 to provide absolute pressure readings.

Mounted within the chamber 6 is a single substrate 7 which has formed thereon three SAW devices X, Y, Z, to provide a temperature compensated pressure and temperature monitoring output. The SAW devices may, for example, be SAW resonators having different resonant frequencies so that the changes in the resonant frequencies of the respective SAW devices may be determined using existing conventional SAW device interrogating technology.

The advantage of this arrangement is that the SAW devices X and Z remain unstrained and only the SAW device Y is strained when the pressure is applied to the sensor. This considerably simplifies the process of sensor calibration and calculation of pressure and temperature from the results of frequency measurements.

Indeed, the measured difference between the two resonant frequencies, $|f_x-f_z|$ depends only on temperature, not on pressure, so the value of the temperature can be immediately found from $|f_x-f_z|$. Since both the devices X and Z are fabricated on the same substrate the frequency difference $|f_x-f_z|$ will depend on the temperature only in the case if the temperature characteristic of the device Z differs from that of the device X. In order to achieve such a differing temperature characteristic, the device Z is rotated relative to the device X at a certain angle as shown in FIG. 1A. The temperature sensitivity depends on the rotation angle. An angle is in the range of 10–30°, in particular 16–20° has been found to achieve particularly good results. For example, an angle of 18° gives the sensitivity of approximately 2 kHz°C$^{-1}$ for the ST-X cut quartz substrate.

The value of the pressure can be found from the measured frequency difference $|f_x-f_z|$. The sensitivity of $|f_x-f_z|$ to pressure usually also depends on temperature. Knowing this dependence from calibration data and having found the temperature from $|f_{x-fz}|$ allows fill temperature compensation of the measured pressure to be achieved without a need of solving non-linear algebraic equations.

The substrate 7 is supported by the base 2 and for convenience may be secured to the base by means of a flexible adhesive. If adhesive is used to secure the substrate in position, the flexibility of the adhesive should be such that the respective end regions 8, 9 of the substrate 7 are free to move as substrate 7 is acted upon by a projection 10 formed integrally with or secured to the lid 5. Accordingly the end regions 8, 9 will be substantially unstrained even when the central region is strained as a result of movement of the diaphragm.

The lid 5 is provided, in the centre of the major surface 5A, with a projection 10 formed by a dimple pressed in the material of the lid. The position of the projection 10 is shown in broken line in FIG. 1A. The projection 10 is able to exert a downward force (as viewed in FIG. 1B) at the centre of the substrate, but is unable to exert a force on ends 8,9.

Suitable antennae are provided for receiving an excitation signal for each of the SAW devices X, Y, Z and for transmitting a response signal from each of the SAW devices. The antennae may be located on the exterior of the container 4 in which case appropriate electrical connections must be provided extending through the material of the container 4. Alternatively, it may be possible to lay the antennae down as tracks on the interior surface of the container 4 or on suitable areas of the substrate 7 not occupied by the SAW devices themselves, In use, a pressure monitor as described above is placed within a zone the pressure of which is to be monitored. The pressure monitor is chosen in light of the pressures to which it is intended to be sensitive, and in particular, the absolute pressure sealed within the chamber 6 is chosen so that the diaphragm is deflected towards the base 3B by the pressure prevailing in the region to which the device is sensitive. This deflection of the diaphragm will cause bending of the substrate 7 only between the edges 11, 12 of the frame 3A and accordingly a change in the resonant frequency of the central SAW device Y. The resonant frequency of the SAW devices may be determined by known techniques to calibrate the monitoring device.

If there is a change in pressure in the zone surrounding the device this will result in a movement of the lid 5 acting as a diaphragm. An increase in pressure will result in movement of the diaphragm towards the base 3B and a reduction in pressure will cause a movement of the diaphragm away from the base 3B. Either change will result in a change in the bending of the substrate 7 with a resultant change in the resonant frequency of the central SAW device Y. By monitoring the changes in resonant frequency of the SAW devices an indication may be provided of the change in pressure. The device may, for example, be located within a vehicle tire to provide a remote indication of a loss of pressure within the vehicle tire.

The embodiment of FIG. 1 is particularly desirable in that one substrate 7 is provided and accordingly SAW devices may be provided on one surface only.

It will be noted that the above described embodiment of the invention is particularly simple to fabricate and comprises in essence, only four elements, namely the base 2, the substrate 7 (with its associated SAW devices), the lid 5 and appropriate antennae (not shown). Furthermore, the device may be constructed using three identical SAW devices, the different characteristics of the Y and Z devices being achieved by their different orientations. The components may be assembled under factory conditions by means of a simple and logical progression, namely the antennae may be laid down as suitable tracks on the base 2 and connected to the antennae, and finally the lid 5 may be secured to the base to complete the unit. The simple assembly techniques offer substantial practical advantages for a mass produced unit to be used in relatively low cost applications such as monitoring the pressure within vehicle tires. The unit, once produced, is completely self-contained and merely requires to be secured in position. Securing the unit in position may be affected by semi skilled or unskilled labor within a factory environment.

Figure 2A:
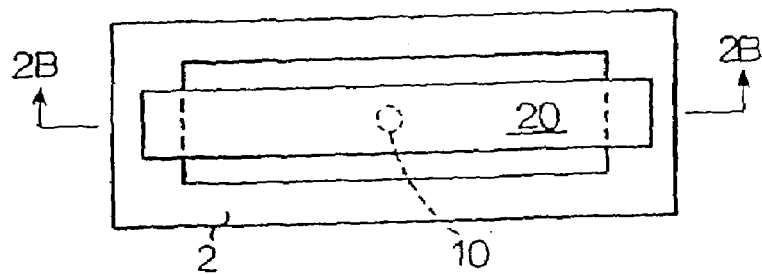
FIG. 2A is a schematic view corresponding to FIG. 1A, but showing a second embodiment of the invention.
Figure 2B:
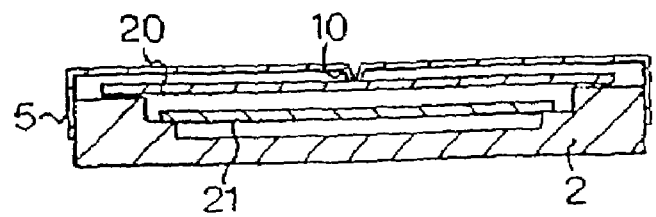
FIG. 2B is a schematic cross sectional view of the second embodiment of the invention along the line 2B—2B of FIG. 2A, with the lid in place.

In the second embodiment of FIG. 2 two substrates 20,21 are provided instead of the single substrate 7 of FIG. 1, and at least two SAW devices are provided on the lower unstrained substrate 21, one of which is inclined relative to the other as in the first embodiment. In other respects, the components in operation of the embodiment of FIG. 2 are substantially the same as those of the embodiment of FIG. 1. As in the case of the embodiment of FIG. 1, the substrates 20, 21 may conveniently be held in position by means of flexible adhesive.

Figure 3A:
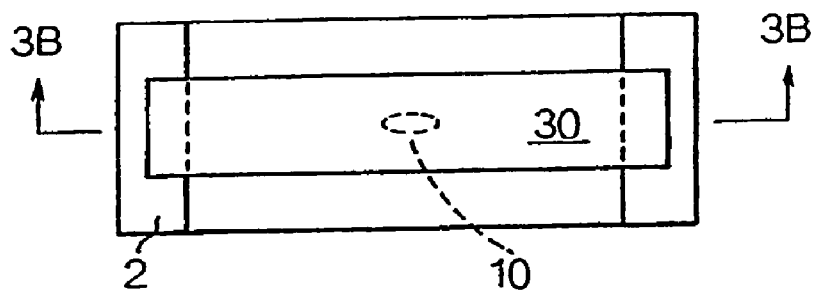
FIG. 3A is a schematic view corresponding to FIG. 1A, but showing a third embodiment of the invention.
Figure 3B:
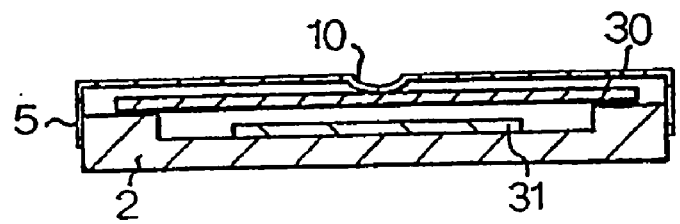
FIG. 3B is a schematic cross sectional view of the third embodiment of the invention along the line 3B—3B of FIG. 3A, with the lid in place.

In the third embodiment (FIG. 3) two substrates 30,31 are provided, and two SAW devices are provided on opposite sides of the upper strained substrate 30. In other respects, the components in operation of the embodiment of FIG. 3 are the same as those of the embodiment of FIG. 2, that is a third SAW device is provided on the unstained substrate at an inclined angle to at least one of said strained devices so as to enable both pressure and temperature readings to be taken.

Figure 4A:
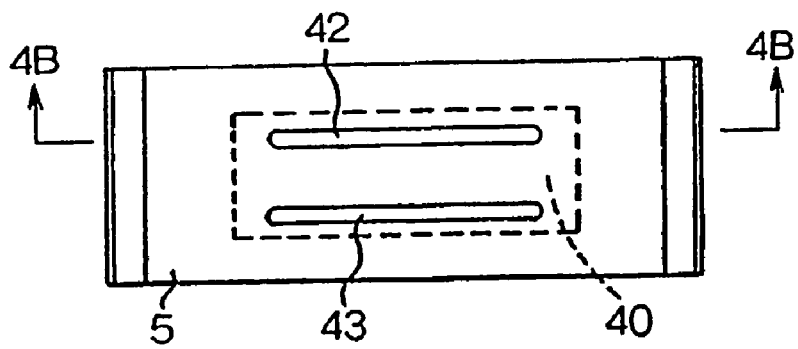
FIG. 4A is a schematic plan view showing a fourth embodiment of the invention
Figure 4B:
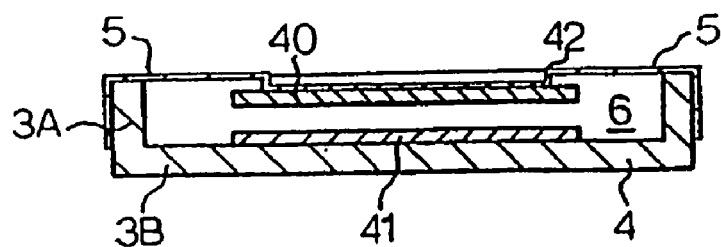
FIG. 4B is a schematic cross sectional view of the fourth embodiment of the invention along the line 4B—4B of FIG. 4A.

Referring now to FIG. 4, a further embodiment of the invention is shown. As in the case of the embodiment of FIGS. 1–3 the device comprises a container 4 which is of ceramic or metal material. The container 4 comprises a rigid frame 3A and a base B. The open mouth of the container is closed by a lid 5 acting as a diaphragm to define a hermetically sealed chamber 6. In the case of this embodiment a SAW device substrate 40 to detect changes in deflection of the diaphragm 5 is secured to the diaphragm itself. To this end, pressed indentations 42, 43 are provided in the diaphragm. The indentations 42, 43 define ridges within the chamber 6 to which the substrate 40 is secured, for example by soldering. The substrate 40 has mounted thereon one or more SAW devices. A further substrate 41 is mounted on the unstrained area of the chamber 6 and carries at least two further SAW devices such that pressure and temperature monitoring capabilities are provided.

In the case of embodiments of FIG. 4, deformation of the lid 5 acting as a diaphragm caused by pressure changes will result directly in deformation of the substrate 40 with a resulting change in the resonant frequency of the SAW devices mounted thereon. Antennae for the SAW devices may be provided by any convenient means, for example electrically conducted track provided on the surface of the container 4 or electrical connections to external antennae passing through the container 4.

Figure 5A:
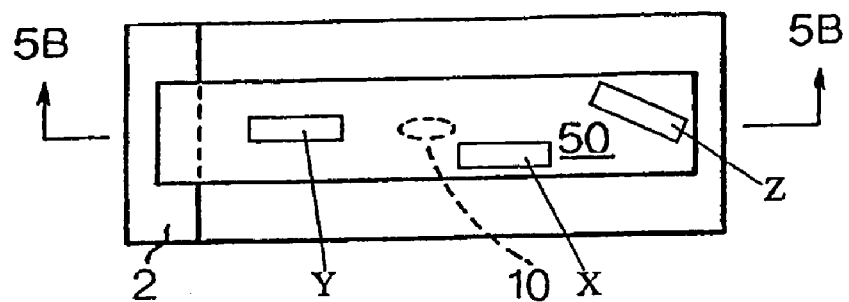
FIG. 5A is a schematic plan view showing a fifth embodiment of the invention.
Figure 5B:
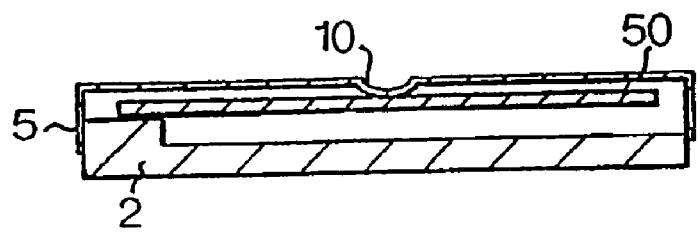
FIG. 5B is a schematic cross sectional view of the fifth embodiment along the line 5B—5B of FIG. 5A.

FIGS. 5A and 5B show a further embodiment of the invention in which the three SAW devices X, Y, Z are mounted on a single substrate 50 which is attached to the base 2 at only one end so as to form a cantilever which is engaged by the projection 10 on the diaphragm at a point part way along the length of the substrate. One of the SAW devices Y is mounted on the cantilever substrate between the supported end and the point of engagement of the projection 10 whilst the other two X, Z are mounted between the point of engagement of the projection 10 and the free end of the cantilever as shown in FIG. 5A. As with the earlier embodiments, the third SAW device Z is inclined to the second X so as to achieve a differential temperature characteristic.

Loading of the substrate by the projection causes strain in the first portion of the substrate between the supported end and the point of engagement of the projections, thereby causing a pressure response in the first SAW device (Y). The second portion of the substrate between the point of engagement of the projection 10 and the free end of the substrate is, however, not strained and provides a reference region—any changes in the characteristics of the two SAW devices X, Z mounted thereon being as a result of temperature changes only.

Figure 6A:
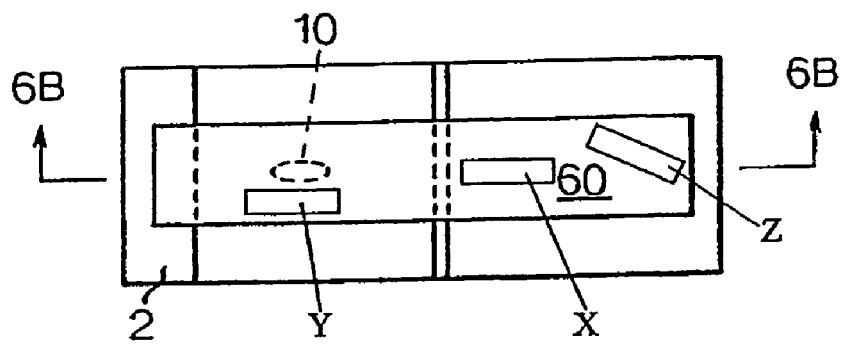
FIG. 6A is a schematic plan view showing a sixth embodiment of the invention.
Figure 6B:
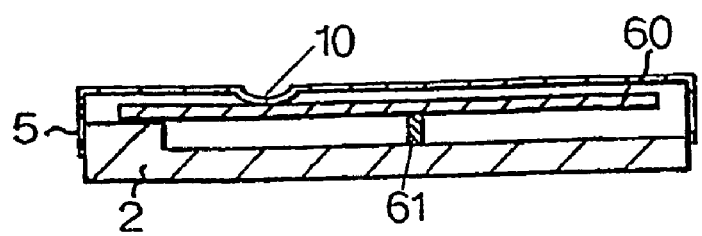
FIG. 6B is a schematic cross sectional view of the sixth embodiment along the line 6B—6B of FIG. 6A.

FIGS. 6A and 6B show a variation of the embodiment of FIGS. 5A and 5B in which the substrate is again attached to the base 2 at one end only but is also now supported at its middle by support 61 so as to split the substrate into two sections, a first beam section which extends between the base mount and the support 61 on which is mounted a first SAW device Y, and a second cantilever section which is formed by the portion of substrate which overhangs the support 61 and on which is mounted second (X) and third (Z) SAW devices. As with the previous embodiments, the third device (Z) is inclined to the second (X) as shown in FIG. 6A. The projection 10 on the diaphragm is then positioned to engage the beam section of the substrate, which constitutes a deformable substrate, causing straining of the first SAW device Y only upon deflecting of the diaphragm. The provision of the support 61 will cause the cantilever section to deflect upwards upon the projection 10 engaging the substrate but to remain unstrained so as to provide a reference region. In other respects, the operation of the embodiments of FIGS. 5 and 6 are the same as for the previously described embodiments. It will, of course, be understood that the second and third SAW devices X, Z in the embodiments of FIGS. 5 and 6 may be mounted in the opposite way around to the positions shown in the drawings.

The invention claimed is:

1. A pressure monitor comprising
  a base having a rigid frame;
  a simply lid secured to the base to define with the base a substantially fluid tight chamber, at least part of the lid being flexible and forming a diaphragm which will deflect in response to changes in the fluid pressure surrounding the monitor;
  means for transmitting movement of the diaphragm to a distortable substrate located within the chamber, wherein such means are located remote from the edge of the frame, the distortable substrate having a first SAW device mounted thereon, and at least a second and a third SAW device mounted on a non-distortable reference substrate section within the chamber, said second SAW device having its direction of propagation inclined at an angle to the direction of propagation of at least one of said first and third SAW devices, said distortable substrate being formed by a first region and said reference substrate section by a second region of a single substrate, wherein movement of the diaphragm induced by a change in pressure in the zone surrounding the monitor results in distortion of the distortable substrate, which is measurable by the SAW device mounted thereon, without distorting said reference substrate section.

2. A pressure monitor according to claim 1, wherein the single substrate takes the form of a beam which is supported at one end on the base by a first support member and is supported at a point partially along its length by a second support member, said first region being formed by the section of the substrate between said first and second support members and said second region being formed by the section of the substrate which projects beyond said second support member, the means for transmitting movement engaging said first region.

3. A pressure monitor according to claim 1, wherein said first SAW device has a direction of propagation which is parallel to the direction of propagation of said third SAW device.

4. A pressure monitor according to claim 1, wherein each of said SAW devices is a SAW resonator.

5. A pressure monitor according to claim 1, wherein each of said SAW devices has a different resonant frequency.

6. A pressure monitor according to claim 1, wherein said second SAW device is oriented with its direction of propagation inclined at an angle in the range of 10–30° to said third SAW device.

7. A pressure monitor according to claim 1, wherein said second SAW device is oriented with its direction of propagation inclined at an angle in the range of 16–20° to said third SAW device.

8. A pressure monitor according to claim 1, wherein said second SAW device is oriented with its direction of propagation inclined at an angle of 18° to said third SAW device.

9. A pressure monitor according to claim 1, wherein all of the SAW devices are located on the same side of a single substrate.

10. A pressure monitor according to claim 1, wherein said SAW devices are distributed on both sides of a single substrate.

* * * * *